United States Patent
Stefan et al.

(10) Patent No.: US 7,199,200 B2
(45) Date of Patent: Apr. 3, 2007

(54) METHOD FOR THE PRODUCTION OF HOMO-, CO- AND BLOCK COPOLYMERS

(75) Inventors: Ingrisch Stefan, Seebruck (DE); Maier Alois, Engelsberg (DE); Pfeuffer Thomas, Trostberg (DE); Steidl Norbert, Kienberg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 10/515,937

(22) PCT Filed: Aug. 1, 2003

(86) PCT No.: PCT/EP03/08547

§ 371 (c)(1),
(2), (4) Date: Nov. 23, 2004

(87) PCT Pub. No.: WO2004/014961

PCT Pub. Date: Feb. 19, 2004

(65) Prior Publication Data

US 2005/0234191 A1 Oct. 20, 2005

(30) Foreign Application Priority Data

Aug. 3, 2002 (DE) ................. 102 35 696

(51) Int. Cl.
- *C08F 118/02* (2006.01)
- *C08F 2/00* (2006.01)
- *C08F 20/06* (2006.01)
- *C08F 212/06* (2006.01)

(52) U.S. Cl. ............... 526/319; 526/200; 526/317.1; 526/347

(58) Field of Classification Search ........... 526/200, 526/347, 317.1, 319
See application file for complete search history.

(56) References Cited

U.S. PATENT DOCUMENTS

| | | | | |
|---|---|---|---|---|
| 4,235,735 | A * | 11/1980 | Marco et al. ............... | 510/276 |
| 4,925,588 | A * | 5/1990 | Berrod et al. .............. | 510/299 |
| 5,227,446 | A * | 7/1993 | Denzinger et al. .......... | 527/314 |
| 5,760,129 | A * | 6/1998 | Lau ........................... | 524/732 |
| 5,763,548 | A * | 6/1998 | Matyjaszewski et al. ... | 526/135 |
| 5,807,937 | A * | 9/1998 | Matyjaszewski et al. ... | 526/135 |
| 6,165,455 | A * | 12/2000 | Torgerson et al. ....... | 424/70.12 |
| 6,864,337 | B2 * | 3/2005 | Yuasa et al. ............... | 526/312 |
| 6,875,832 | B2 * | 4/2005 | White et al. .............. | 526/219.6 |
| 2003/0130416 | A1 * | 7/2003 | Flosbach et al. ........... | 524/801 |
| 2003/0170306 | A1 * | 9/2003 | Raether et al. ............. | 424/484 |
| 2004/0176534 | A1 * | 9/2004 | Rogers et al. ............. | 525/54.3 |

FOREIGN PATENT DOCUMENTS

| | | |
|---|---|---|
| DE | 196 37 190 A | 3/1997 |
| DE | 100 27 744 A1 | 12/2001 |
| DE | 100 29 694 A1 | 12/2001 |
| DE | 10027746 A1 * | 12/2001 |
| FR | 1 560 559 A | 3/1969 |
| WO | WO-00 39169 A | 7/2000 |

* cited by examiner

Primary Examiner—David W. Wu
Assistant Examiner—M. Bernshteyn
(74) Attorney, Agent, or Firm—Fulbright & Jaworski L.L.P.

(57) ABSTRACT

A process is described for producing homo-, co- and block copolymers by controlled radical polymerization in aqueous solution, wherein a monomer component (A) consisting of at least one radically polymerizable monomer, an initiator component (B) consisting of at least one radical initiator, a polysaccharide component (C) consisting of at least one cyclic polysaccharide (derivative) and a regulator component (D) consisting of at least one compound of the general formula (Ia) or/and (Ib) are reacted in the presence of water,

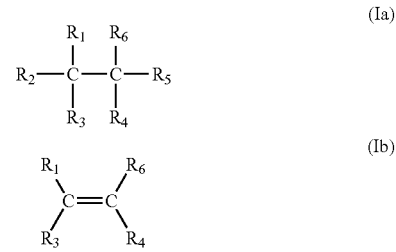

in which $R_1$ to $R_6$ can each independently denote hydrogen, an optionally substituted $C_1$–$C_{20}$ alkyl residue, $C_3$–$C_8$ cycloalkyl residue, $C_7$–$C_{34}$ aralkyl residue or optionally an aromatic $C_6$–$C_{14}$ hydrocarbon residue and $R_2$ and $R_5$ can additionally denote polymer residues having an average molecular mass (number average) of 100 to 50,000 Daltons, and at least two but at most four of the residues $R_1$ to $R_6$ represent an aromatic hydrocarbon residue. In this manner it is possible to produce polymers with a very narrow molecular weight distribution. Moreover, due to the much lower amounts of initiator and regulator compared to the prior art, the polymers contain only very small amounts of regulator and initiator decomposition products.

18 Claims, No Drawings

METHOD FOR THE PRODUCTION OF HOMO-, CO- AND BLOCK COPOLYMERS

This is a §371 from PCT/EP2003/008547 filed Aug. 1, 2003 which claims priority from German Patent Application No. 102 35 696.3 filed Aug. 3, 2002.

The present invention concerns a process for producing homo-, co- and block copolymers by controlled radical polymerization of olefinically unsaturated monomers in aqueous solution.

The technical production of polymers by means of radical polymerization is a relatively very economical process that is often used on a commercial scale. The molecular weight distributions (polydispersities) determined by the quotient of the weight average and number average molecular weight ($M_w/M_n$) of the synthetic polymers is generally high in current processes.

For several years there has been a major interest in processes or process methods that are suitable for producing a large number of polymers and enable polymers to be provided with a predetermined structure, molecular weight and molecular weight distribution.

Processes for controlled radical polymerization have been known for a long time such as the "living" radical suspension polymerization of methyl methacrylate in a water/alcohol mixture (Sawamoto et al., Macromolecules 32, 1999, 2204–2209), 2,2,6,6-tetramethyl-piperidinyl-1-oxy-(TEMPO)-controlled "living" radical polymerization of water-soluble styrene derivatives in ethylene glycol/water mixtures (Polymer 40, 1999, 4505–4514) or controlled bulk polymerization of 2,5-bis[(4-butyl-benzoyl)oxy]styrene using 1-phenyl-1-(2',2',6',6'-tetramethyl-1'-piperidinyloxy) ethane as the initiator system (Macromol. Chem. Phys. 200, 1999, 2338–2344). Triazolinyl radical-controlled reactions have also been described (Macromol. Chem. Phys. 199, 1998, 763–769).

A disadvantage of the processes of the prior art is that either an emulsifier or an organic cosolvent has to be added due to the water-insolubility of the monomers and radical scavenger in water. Moreover, the insolubility of the radical scavenger in water is a major problem and consequently the process has to be carried out in solvent mixtures that are mainly composed of organic solvents even when water-soluble monomers are used in order to obtain a homogeneous reaction mixture.

Radical atom transfer polymerization (ATRP) is another method of radical polymerization. In ATRP olefinically unsaturated monomers are polymerized with a catalyst/initiator system consisting of a metal complex such as CuBr*2 bipyridine as a catalyst and a halogen compound as an initiator. This methodology is described by Matyjaszewski et al. Matyjaszewski et al. investigated the controlled "living" radical atom transfer polymerization of styrene (J. Am. Chem. Soc. 119, 1997, 674–680) or (meth)acrylates with different initiator systems in organic solvents (Macromolecules 31, 1998, 1527–1534; Macromolecules 32, 1999, 5772–5776) or in emulsion (Macromolecules 31, 1998, 5951–5954).

A disadvantage of this process is the water-insolubility of the metal/ligand catalysts (heavy metal complexes) used for the ATRP polymerization. Thus even if water-soluble monomers are used, the process has to be carried out in solvent mixtures that are mainly composed of organic solvents in order to obtain a homogeneous reaction solution. Furthermore, in ATRP the metal residue from the catalyst (e.g. copper) in the polymer is often very high since ATRP is often carried out in bulk or in organic solution. Copper halogenides are a health risk and also impair the material properties of the polymers. The heavy metal complexes that are used are problematic in several respects. They result in a strong discolouration of the polymers, are difficult to remove and do not allow the use of monomers with free carboxylic acid groups. However, (block co-)polymers containing precisely these monomers (acrylic acid, methacrylic acid, maleic acid) are desirable in construction chemical products and formulations which is why an alternative process would be of major advantage.

The radical polymerization of acrylates, methacrylates and vinyl monomers in aqueous solution in the presence of cyclodextrins is known. Ritter et al. examined the free radical polymerization of cyclodextrin-complexed (meth) acrylates in aqueous solution (Macromolecules 32, 1999, 5236–5239; DE-OS 195 33 269). The emulsion polymerization and suspension polymerization of vinyl compounds and/or (meth)acrylates in aqueous solution in the presence of cyclodextrins is described in the documents EP-A 0896027, EP-A 0780401 and EP-A 0853092.

Controlled radical polymerization using radical scavengers such as N-oxides (nitroxyl radicals) or triazolinyl radicals in aqueous solution was improved by adding cyclodextrins. This eliminated the problem of the insolubility of the olefinically unsaturated monomers and of the radical scavenger in aqueous solution (DE-OS 100 27 744) and hence it is not necessary to add emulsifiers.

Radical atom transfer polymerization (ATRP) in aqueous solution is also improved by the presence of cyclodextrins. Olefinically unsaturated monomers and water-insoluble initiators and metal ligand compounds were converted into water-soluble forms by adding cyclodextrins and polymerized without the addition of emulsifiers, protective colloids etc. or organic cosolvents (DE-OS 100 27 746).

A prerequisite of both processes described above is that the cyclodextrins have to be used at concentrations that are equimolar to the monomers. For this reason it is only possible to work in aqueous solutions which contain very small amounts (only up to about 10% by weight) of monomers. This makes these two variants impractical for industrial processes on a ton-scale.

Furthermore, the same disadvantages that were mentioned above also apply to radical ATRP in aqueous solution in the presence of cyclodextrins.

Copper halogenides are a health risk, impair the material properties of the polymer, strongly discolour the polymers that are obtained, are difficult to remove and do not allow the use of monomers with free carboxylic acid groups.

Controlled radical polymerization of olefinically unsaturated monomers in the presence of 1,1-diphenylethylene is also known. Sato et al. examined the influence of 1,1-diphenylethylene on the radical polymerization of di-n-butylitaconate in benzene (European Polymer Journal 37, 2001, 2055–2061). Nuyken et al. investigated the mechanism of the "living" radical homopolymerization of styrene in the presence of 1,1-diphenylethylene in bulk and block copolymerization with methyl methacrylate (Macromol. Rapid. Comm. 22, 2001, 700–703). Nuyken et al. also reported the homo- and block copolymerization of water-soluble and/or water-insoluble olefinically unsaturated monomers in the presence of 1,1-diphenyl-ethylene in organic solvents, in water and in bulk (Macromol. Symp. 177, 2002, 25–41).

However, this process is not suitable for polymers with very low polydispersities which are in general between 2 and 3. In addition the block copolymers contain a considerable amount of homopolymer. This process is also problematic for a production on a ton-scale since polymerization in bulk on a ton-scale is very reluctantly carried out because of heat dissipation. It is very difficult to dissipate the heat liberated in bulk polymerizations due to the viscosity and there is a risk of a runaway reaction.

Controlled radical polymerization of monomers in the presence of a radical initiator and a compound (A) of formula $R_1R_2C=CR_3R_4$ in which $R_1$ to $R_4$ can each independently be hydrogen, a substituted alkyl residue, cycloalkyl residue, an unsubstituted or a substituted aromatic hydrocarbon residue, is also known from the applications DE 100 29 695 A1, DE 100 29 697 A1, DE 198 58 708 A1, DE 198 60 011 A1, DE 199 09 803 A1, DE 199 61 063 A1 and DE 199 09 752 A1.

The processes described in these applications are all carried out in a strongly alkaline medium in the presence of at least one base. In addition the amounts of initiator are up to 50% by weight based on the monomer component and the amount of compound (A) is also stated to be up to 50% by weight based on the monomer component.

Moreover, in the processes described in DE 100 29 697 A1 and DE 199 61 063 A1 the reaction mixture contains 10% by weight or less water and the reaction is carried out at a pressure between 1 and 300 bar.

The polydispersities of the block copolymers are in a range between 1.5 and 4.2 according to the examples given in the said publications.

Furthermore in the examples it is stated that monomers and compound (A) and the initiator in aqueous solution are metered into the reaction solution separately and concurrently over a certain period.

Hence this process is not suitable for producing polymer solutions at any desired pH in the range between 1 and 14 which is why it is not possible to prepare acidic or pH-neutral polymer solutions in this manner. The (block co-) polymers and aqueous (block co-)polymer solutions containing unneutralized (meth)acrylic acid and/or maleic acid units that are of interest for construction chemicals and formulations cannot be obtained by this process. Furthermore, the high amounts of initiator and regulator make it impractical to use them industrially on a ton-scale due to their hazard potential and they are very expensive. Moreover, the described polymers are contaminated with a high residual amount of decay products of the initiators and compound (A) which adversely affects the material properties of the polymers and aqueous polymer solutions.

Finally the polydispersities of the block copolymers described as examples are very high which is why, strictly speaking, it is not a controlled radical block copolymerization. Also the procedure of continuously adding monomer and initiator elucidated in the publications is not in accordance with the criteria of a controlled "living" polymerization. In the latter case all initiator radicals and monomer radicals are initially present and are homogeneously dispersed in the reaction space. All polymer chains are then started simultaneously and each chain adds the same number of monomer molecules in irreversible growth steps and hence there is almost no distribution of the degree of polymerization.

Hence the object of the present invention was to provide a process for producing homo-, co- and block copolymers by controlled radical polymerization in aqueous solution which at least partially overcomes the said disadvantages of the prior art and enables a controlled and environmentally friendly production of the corresponding polymers without the addition of emulsifiers, protective colloids or organic cosolvents.

This object of providing a process for producing homo-, co- and block copolymers by controlled radical polymerization in aqueous solution was achieved according to the invention by reacting a monomer component (A) consisting of at least one radically polymerizable monomer, an initiator component (B) consisting of at least one radical initiator, a polysaccharide component (C) consisting of at least one cyclic polysaccharide (derivative) and a regulator component (D) consisting of at least one compound of the general formula (Ia) or/and (Ib) in the presence of water,

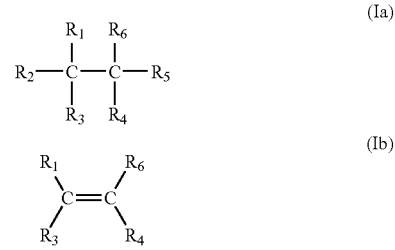

in which $R_1$ to $R_6$ can each denote hydrogen, an optionally substituted $C_1$–$C_{20}$ alkyl residue, $C_3$–$C_8$ cycloalkyl residue, $C_7$–$C_{34}$ aralkyl residue or aromatic $C_6$–$C_{14}$ hydrocarbon residue and $R_2$ and $R_5$ can additionally denote polymer residues having an average molecular mass (number average) of 100 to 50 000 Daltons and at least two but at most four of the residues $R_1$ to $R_6$ represent an aromatic hydrocarbon residue.

Suitable substituents of the $C_1$–$C_{20}$ alkyl residues, $C_3$–$C_8$ cycloalkyl residues, $C_7$–$C_{34}$ aralkyl residues or aromatic $C_6$–$C_{14}$ hydrocarbon residues are for example OH, SH, $NH_2$, $NHR_{13}$, $N(R_{13})_2$, $NH_3^+$, $NH_2R_{13}^+$, $NH(R_{13})_2^+$, $N(R_{13})_3^+$, CN, $SO_3X$, $PO_3X_2$, $CO_2X$ and CHO, where X denotes H, alkali or alkaline earth ions and $R_{13}$ denotes a $C_1$–$C_5$ alkyl residue.

The invention preferably concerns a process for producing homo-, co- and block copolymers by controlled radical polymerization in aqueous solution, characterized in that a monomer component (A) comprising at least one radically polymerizable monomer, an initiator component (B) comprising at least one radical initiator, a polysaccharide component (C) comprising at least one cyclic polysaccharide or/and polysaccharide derivative and a regulator component (D) comprising at least one compound of the general formula (Ia) or/and (Ib) are reacted in the presence of water,

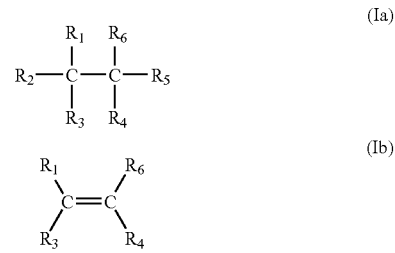

in which
$R_1$, $R_3$, $R_4$ and $R_5$ each independently represent hydrogen, an optionally substituted $C_1$–$C_{20}$ alkyl residue, $C_3$–$C_8$ cycloalkyl residue, $C_7$–$C_{34}$ aralkyl residue or aromatic $C_6$–$C_{14}$ hydrocarbon residue, $R_2$ and $R_5$ each independently represent hydrogen, an optionally substituted $C_1$–$C_{20}$ alkyl residue, $C_3$–$C_8$ cycloalkyl residue, $C_7$–$C_{34}$ aralkyl residue or aromatic $C_6$–$C_{14}$ hydrocarbon residue, or/and a polymer residue having an average molecular mass (number average) of 100 to 50 000 Daltons, and at least two but at most four of the residues $R_1$ to $R_6$ represent an aromatic hydrocarbon residue. The substituents are selected from the group consisting of OH, SH, $NH_2$, $NHR_{13}$, $N(R_{13})_2$, $NH_3^+$, $NH_2R_{13}^+$, $NH(R_{13})_2^+$, $N(R_{13})_3^+$, CN, $SO_3X$, $PO_3X_2$, $CO_2X$ and CHO where X denotes H, alkali or alkaline earth ions and $R_{13}$ denotes a $C_1$–$C_5$ alkyl residue.

It surprisingly turned out that homo-, co- and block copolymers having very narrow molecular weight distributions are obtained by this process. Moreover, due to the considerably smaller amounts of initiator and regulator compared to the prior art, the polymers surprisingly contain only very small amounts of regulator and initiator decay products which is also advantageous.

In the process according to the invention a monomer component (A), an initiator component (B), a polysaccharide component (C) and a regulator component (D) are reacted in aqueous solution.

All radically convertible monomers which can be radically homopolymerized or copolymerized are suitable as the monomer component (A). Furthermore, any mixtures of various hydrophilic and hydrophobic monomers can also be used.

Examples of preferred monomers (A) are for example:

$C_1$ to $C_{20}$ alkyl and hydroxyalkyl esters of monoethylenically unsaturated $C_3$ to $C_{12}$ monocarboxylic acids or $C_4$ to $C_{10}$ dicarboxylic acids, for example methyl methacrylate, ethyl methacrylate, propyl methacrylate (all isomers), butyl methacrylate (all isomers), 2-ethylhexyl methacrylate, isobornyl methacrylate, methyl acrylate, ethyl acrylate, propyl acrylate (all isomers), butyl acrylate (all isomers), 2-ethylhexyl acrylate, isobornyl acrylate, benzyl acrylate, phenyl acrylate, stearyl acrylate, diethyl maleate, hydroxyethyl acrylate, hydroxypropyl acrylate, hydroxybutyl acrylate, also (meth)acrylic esters of alkoxylated $C_1$ to $C_{20}$ alcohols which are converted with 2 to 100 moles of ethylene oxide, propylene oxide, butylene oxide or mixtures thereof, benzyl methacrylate, phenyl methacrylate, stearyl methacrylate, methacrylonitrile, acrylonitrile, functionalized methacrylates, acrylates and styrenes selected from glycidyl methacrylate, 2-hydroxyethyl methacrylate, hydroxypropyl methacrylate (all isomers), hydroxybutyl methacrylate (all isomers), cyclohexyl methacrylate, cyclohexyl acrylate, hexyl methacrylate and hexyl acrylate (all isomers in each case), diethylaminoethyl methacrylate, triethylene glycol methacrylate, itaconic anhydride, itaconic acid, glycidyl acrylate, 2-hydroxyethyl acrylate, diethylaminoethyl acrylate, triethylene glycol acrylate, methacrylamide, N-tert.-butylmethacrylamide, N-n-butylmethacrylamide, N-methylolmethacrylamide, N-ethylolmethacrylamide, N-tert.-butylacrylamide, N-butylacrylamide, N-methylolacrylamide, N-ethylolacrylamide, vinylbenzoic acid (all isomers), diethylamino-styrene (all isomers), α-methylvinylbenzoic acid (all isomers), diethylamino-α-methylstyrene (all isomers), p-methylstyrene, p-vinylbenzenesulfonic acid, trimethoxysilylpropyl methacrylate, triethoxysilylpropyl methacrylate, tributoxysilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl chloride, vinyl fluoride, vinyl bromide, vinyl alcohol, vinyl ethers of $C_1$ to $C_{20}$ alcohols, vinyl ethers of alkoxylated $C_1$ to $C_{20}$ alcohols and vinyl ethers or polyalkylene oxides such as polyethylene oxide, polypropylene oxide or polybutylene oxide, monoethylenically unsaturated $C_3$ to $C_{12}$ monocarboxylic acids, alkali metal salts and/or ammonium salts thereof, for example acrylic acid, methacrylic acid, dimethylacrylic acid, ethylacrylic acid, allylacetic acid or vinylacetic acid, additionally monoethylenically unsaturated $C_4$ to $C_{10}$ dicarboxylic acids, semi esters, anhydrides, alkali metal salts and/or ammonium salts thereof, for example maleic acid, fumaric acid, itaconic acid, mesaconic acid, methylenemalonic acid, citraconic acid, maleic anhydride, itaconic anhydride or methylmalonic anhydride; additionally sulfonic acid groups or salts thereof for example monoethylenically unsaturated monomers thereof containing alkali metal or ammonium salts for example allylsulfonic acid, styrenesulfonic acid, 2-acrylamido-2-methylpropanesulfonic acid (AMPS), methallylsulfonic acid, vinylsulfonic acid, acryl-3-sulfopropyl esters or methacrylic acid-3-sulfopropyl esters, additionally phosphonic acid groups or salts thereof for example monoethylenically unsaturated monomers thereof containing alkali metal or ammonium salts for example vinylphosphonic acid, allylphosponic acid or acrylamidoethylpropanephosphonic acid, in addition amides of mono-ethylenically unsaturated $C_3$ to $C_{12}$ monocarboxylic acids or $C_4$ to $C_{10}$ dicarboxylic acids and said acids N-substituted with one or two identical or different $C_1$–$C_5$ alkyl residues for example acrylamides, N-alkylacrylamides or N,N-dialkylacrylamides each containing 1 to 18 C atoms in the alkyl group such as N-methylacrylamide, N,N-dimethylacrylamide, N-tert.-butylacrylamide or N-octadecylacrylamide, maleic acid monomethylhexylamide, maleic acid monodecylamide, diethylaminopropyl-methacrylamide or acrylamidoglycolic acid; additionally alkylamidoalkyl(meth)-acrylates for example dimethylaminoethyl acrylate, dimethylaminoethyl methacrylate, ethylaminoethyl acrylate, diethylaminoethyl methacrylate, dimethylaminopropyl acrylate or dimethylaminopropyl methacrylate; additionally vinyl esters, vinyl formate, vinyl acetate, vinyl propionate or vinyl butyrate where these can also be saponified after polymerization; additionally N-vinyl compounds for example N-vinylpyrrolidone, N-vinylcaprolactam, N-vinylformamide, N-vinyl-N-methyl-formamide, 1-vinylimidazole or 1-vinyl-2-methylimidazole; additionally styrene or derivatives thereof such as α-methylstyrene, indene, dicyclopentadiene. Monomers which carry amino or imino groups such as dimethylaminoethyl methacrylate, diethylaminoethyl acrylate, diethylaminopropyl methacrylamide or allylamine, monomers which carry quarternary ammonium groups which are for example present as salts obtained by reacting the basic amino groups with acids such as hydrochloric acid, sulfuric acid, nitric acid, formic acid or acetic acid, or are present in a quarternized form (examples of suitable quarternization agents are dimethylsulfate, diethylsulfate, methyl chloride, ethyl chloride or benzyl chloride) such as dimethylaminoethyl acrylate hydrochloride, diallyldimethylammonium chloride, dimethylaminoethyl acrylate methyl chloride, dimethylaminoethylaminopropyl-methacrylamide-methosulfate, vinylpyridinium salts or 1-vinylimidazolium salts; monomers in which the amino groups and/or ammonium groups are only released after polymerization and subsequent hydrolysis such as N-vinylformamide or N-vinyl acetamide and mixtures of two or more of the above-mentioned monomers.

An initiator component (B) is also used in the process according to the invention which comprises at least one radical initiator. Suitable free radical initiators include peroxide initiators such as for example hydrogen peroxide, tert.-butyl hydroperoxide, dilauroyl peroxide, dibenzoyl peroxide, tert. amylperoxyneodecanoate, tert. butylperoxyneodecanoate, tert. butylperoxypivalate, 2,5-dimethyl-2,5-di(2-ethylhexanoylperoxy)hexane, tert. amylperoxy-2-ethyl hexanoate, tert. butylperoxy-2-ethyl hexanoate, tert. amylperoxybenzoate, tert. butylperoxybenzoate or peroxodisulfate initiators such as ammonium peroxodisulfate, sodium poeroxodisulfate, potassium peroxodisulfate, lithium peroxodisulfate. Suitable azo initiators are for example 2,2'-azobis(isobutyronitrile), 2,2'-azobis(2-methylbutyronitrile), 2,2'-azobis(2-cyano-2-butane), dimethyl-2,2'-azobisdimethyl-isobutyrate, 4,4'-azobis(4-cyanopentanoic acid), 1,1'-azobis(cyclohexane-1-carbonitrile), 2-(tert.-butylazo)-2-cyanopropane, 2,2'-azobis[2-methyl-N-(1,1')-bis-(hydroxymethyl)-2-hydroxyethyl]propionamide, 2,2'-azobis(2-methyl-N-hydroxy-ethyl)propionamide, 2,2'-azobis(N,N-dimethylene-isobutyramidine)dihydrochloride, 2,2'-azobis(2-amidinopropane)dihydrochloride, 2,2'-azobis(N,N'-dimethyleneisobutyramine), 2,2'-azobis(2-methyl-N-[1,1'-bis(hydroxymethyl)ethyl]propionamide), 2,2'-azobis[2-methyl-N-(2-hydroxyethyl)propionamide], 2,2'-azobis(isobutyramide)-dihydrate, 2,2'-azobis(2,4-trimethylpentane), 2,2'-azobis(2-methylpropane), 2,2'-azobis(4-methoxy-2,4-dimethylvalerionitrile), 2,2'-azobis(2-cyclopropylpropionitrile), 2,2'-azobis(2,4-dimethylvalerionitrile), (2-carbamoylazo)isobutyronitrile, 2-phenylazo-4-methoxy-2,4-dimethylvalerionitrile, 2,2'-azobis(2-methyl-N-phenylpropionamidine)dihydrochloride, 2,2'-azobis[N-(4-chlorophenyl)-2-methylpropionamidine]dihydrochloride, 2,2'-azobis[N-(4-hydroxyphenyl)-2-methylpropion-amidine]dihydrochloride, 2,2'-azobis[N-(4-aminophenyl)-2-methylpropionamidine]-tetrahydrochloride, 2,2'-azobis[2-methyl-N-(phenylmethyl)-propionamidine]dihydrochloride, 2,2'-azobis[2-methyl-N-2-propenylpropionamidine]dihydrochloride, 2,2'-azobis[N-(2-hydroxyethyl)-2-methylpropionamidine]dihydrochloride, 2,2'-azobis[2-(5-methyl-2-imidazolin-2-yl)propane)dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(5-hydroxy-3,4,5,6-tetrahydro-pyrimidin-2-yl)propane]dihydrochloride, 2,2'-azobis[2-[1-(2-hydroxyethyl)-2-imidazolin-2-yl]propane] dihydrochloride, 2,2'-azobis(2,4,4-trimethylpentane), 2,2'-azobis(2-cyanopropanol), 2,2'-azobis(2-cyclopropylpropionitrile), 2,2'-azobis(2,4-dimethylvaleronitrile) and 2,2'-azobis(2-methylpropionitrile). Radical initiators containing one or more azo or peroxo groups that have a half life of 1 hour at a decomposition temperature of 60 to 90° C. are preferably used. Symmetric as well as asymmetric compounds can be used as peroxide and azo initiators.

Suitable asymmetric azo initiators are for example phenylazomethylmalonodinitrile and derivatives thereof. In this case the phenyl group can also carry any electron-attracting and electron-pushing substituents such as a linear or branched alkyl residue with 2 or more C atoms, cycloalkyl, alcohol, ether, polyether, amine, aralkyl residue, a substituted or unsubstituted aromatic, heterocyclic or olefinic hydrocarbon (where suitable substituents are alcohol, ether, polyether, amine residues, halogen and $—C(O)R_7$, $—CR_7R_8—OR_9$, $—O—C(O)R_7$, $—CN$, $—OCN$, $—SCN$, $—O—C=NR_7$, $—S—C=NR_7$, $—O—CR_7R_8—CR_9R_{10}NR_{11}R_{12}$, $—N=C=O$, $—C=NR_7$, $—CR_7R_8$-Hal, $—C(S)R_7$, $—CR_7R_8—P(O)R_9R_{10}$, $—CR_7R_8PR_9R_{10}$, $—CR_7R_8—NR_9R_{10}$, $—CR_7R_8(OR_9)(OR_{10})$, $—CR_7R_8(OR_9)—(NR_{10})$, $—CR_7R_8(NR_9)(NR_{10})$, an acid anhydride, acetal, ketal group, $—SO_2R_7$, an amidine group, $—NR_7C(S)NR_8$, $—NR_7C(S)—OR_8$, $—N=C=S$, $NO_2$, $—C=N—OH$, $—N(R_7)=NR_8$, $—PR_7R_8R_9$, $—OSiR_7R_8R_9$ or $—SiR_7R_8R_9$ in which $R_7$ to $R_{12}$ are each independently hydrogen or methyl), a halogen atom, a substituted or unsubstituted, linear or branched alkenyl or alkinyl group, preferably a $C_2$–$C_{20}$ alkyl group or alkenyl group (where suitable substituents are alcohol, ether, polyether, amine residues, halogen and $—C(O)R_7$, $—CR_7R_8—OR_9$, $—O—C(O)R_7$, $—CN$, $—OCN$, $—SCN$, $—O—C=NR_7$, $—S—C=NR_7$, $—O—CR_7R_8—CR_9R_{10}NR_{11}R_{12}$, $—N=C=O$, $—C=NR_7$, $—CR_7R_8$-Hal, $—C(S)R_7$, $—CR_7R_8—P(O)R_9R_{10}$, $—CR_7R_8—PR_9R_{10}$, $—CR_7R_8—NR_9R_{10}$, $—CR_7R_8(OR_9)(OR_{10})$, $—CR_7R_8(OR_9)(NR_{10})$, $—CR_7R_8(NR_9)(NR_{10})$, an acid anhydride, acetal, ketal group, $—SO_2R_7$, an amidine group, $—NR_7C(S)NR_8$, $—NR_7C(S)—OR_8$, $—N=C=S$, $—NO_2$, $—C=N—OH$, $—N(R_7)=NR_8$, $—PR_7R_8R_9$, $—OSiR_7R_8R_9$ or $—SiR_7R_8R_9$ in which $R_7$ to $R_{12}$ are each independently hydrogen or methyl)-$C(O)R_7$, $—CR_7R_8—OR_9$, $—O—C(O)R_7$, $—CN$, $—OCN$, $—SCN$, $—O—C=NR_7$, $—S—C=NR_7$, $—O—CR_7R_8—CR_9R_{10}NR_{11}R_{12}$, $—N=C=O$, $—C=NR_7$, $—CR_7R_8$-Hal, $—C(S)R_7$, $—CR_7R_8—P(O)R_9R_{10}$, $—CR_7R_8—PR_9R_{10}$, $—CR_{78}—NR_9R_{10}$, $—CR_7R_8(OR_9)(OR_{10})$, $—CR_7R_8(OR_9)(NR_{10})$, $—CR_7R_8(NR_9)(NR_{10})$, an acid anhydride, acetal, ketal group, $—SO_2R_7$, an amidine group, $—NR_7C(S)NR_8$, $—NR_7C(S)—OR_8$, $—N=C=S$, $NO_2$, $—C=N—OH$, $—N(R_7)=NR_8$, $—PR_7R_8R_9$, $—OSiR_7R_8R_9$ or $—SiR_7R_8R_9$ in which $R_7$ to $R_{12}$ are each independently hydrogen or methyl or are selected from the aforementioned substituents and in particular represent a radical-stabilizing or/and a sterically demanding group. According to a preferred embodiment water-soluble compounds are used as azo and peroxide initiators.

A reducing agent such as a bisulfite for example alkali metal bisulfite, hydrosulfite and hyposulfite or/and sodium formaldehyde sulfoxylate or a reducing sugar such as ascorbic acid can be used in combination with the starter to form a redox system. The amount of initiator component is preferably about 0.01 mole % to about 10 mole % of the added monomer and in a redox system a preferred range of about 0.01 mole % to about 10 mole % of the reducing agent is used. Furthermore, other transition metal catalysts such as iron salts can also be used within the scope of the present invention.

Within the scope of the present invention at least one component (C) comprising at least one cyclic polysaccharide or/and polysaccharide derivative is used. Cyclodextrins are preferably used as cyclic polysaccharides which are cycloamyloses containing 1,4-linked glucose units such as those formed when starch is degraded by *Bacillus macerans* or *Bacillus circulans* by the action of cyclodextrin glycosyl transferase e.g. cyclohexa-, cyclohepta- or cyclooctaamyloses containing 6, 7 or 8 cyclically-linked glucose units (α-, β-, γ-cyclodextrin). The cyclodextrins used to prepare the regulator component (D)/polysaccharide component (C) complexes and initiator component (B)/polysaccharide component (C) complexes can for example be unsubstituted cyclodextrins or substituted cyclodextrins and in particular esters, alkyl ethers, hydroxyalkyl ethers, alkoxycarbonylalkyl ethers or/and carboxyalkyl ethers of cyclodextrins or salts thereof in which the alkyl residues have 1 to 30 C atoms. Suitable carboxylic acid components for the cyclodextrin esters are aryl, aralkyl and alkylcarboxylic acids, preferably aralkyl- and alkylcarboxylic acids, particularly preferably alkylcarboxylic acids. Preferred alkyl residues are those with 2 to 30 C atoms in particular with 2 to 18 C atoms and aryl residues with 6 to 14 C atoms. The mono-, di- or triethers or mono-, di-, triesters or monoester diethers are usually obtained by etherification of α-, β-, γ-cyclodextrins using alkylation agents such as dimethyl sulfate or alkyl halogenides with 1 to 30 C atoms and/or esterification using for example acetic acid, higher carboxylic acids (fatty acids) or succinic acid.

Linear or branched, optionally substituted alkyl groups with 1 to 30 C atoms, preferably with 2 to 24 C atoms, particularly preferably with 2 to 18 C atoms are particularly suitable as alkyl components for the cyclodextrin alkyl ethers, cyclodextrin hydroxyalkyl ethers, cyclodextrin alkoxycarbonylalkyl ethers and cyclodextrin carboxyalkyl ethers. Preferred cyclodextrins are α-, β-, γ-cyclodextrin, partially ($\geq 1\%$, preferably $\geq 2\%$, more preferably $\geq 5\%$) or completely acetylated, methylated, hydroxylated and succinylated α-, β-, γ-cyclodextrin and mixed methylated and acetylated forms of β-cyclodextrins. B-Cyclodextrin, 2,6-dimethyl-β-cyclodextrin and (2-hydroxy)-propyl-β-cyclodextrin are particularly preferred.

A regulator component (D) comprising at least one compound of the general formula (Ia) or/and (Ib) is also used within the scope of the process according to the invention

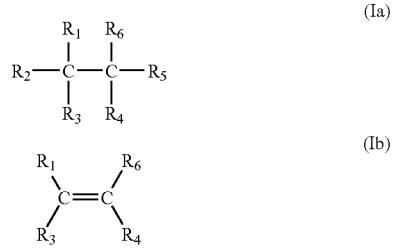

in which $R_1$ to $R_6$ each independently of one another represent hydrogen, an optionally substituted $C_1$–$C_{20}$ alkyl residue, an optionally substituted cycloalkyl residue in particular a $C_3$–$C_8$ cycloalkyl residue, an optionally substituted $C_7$–$C_{34}$ aralkyl residue, an optionally substituted aromatic $C_6$–$C_{14}$ hydrocarbon residue, (where the substituents preferably have the following meaning: OH, SH, $NH_2$, $NHR_{13}$, $N(R_{13})_2$, $NH_3^+$, $NH_2R_{13}^+$, $NH(R_{13})_2^+$, $N(R_{13})_3^+$, CN, $SO_3X$, $PO_3X_2$, $CO_2X$ and CHO in which X denotes H, alkali or alkaline earth ions and $R_{13}$ denotes a $C_1$–$C_5$ alkyl residue) provided that at least two but at most 4 of the residues $R_1$ to $R_6$ represent an aromatic hydrocarbon residue.

In this connection the aromatic hydrocarbon residue can also carry any electron-attracting and electron-pushing substituents such as a linear or branched alkyl residue with 1 to 4 C atoms, a cycloalkyl, alcohol, ether, polyether, amine, aralkyl residue, a substituted or unsubstituted aromatic, heterocyclic or olefinic hydrocarbon, a halogen atom, a substituted or unsubstituted, linear or branched alkenyl or alkinyl group, —C(O)$R_7$, —CR$_7$R$_8$—OR$_9$, —O—C(O)$R_7$, —CN, —OCN, —SCN, —O—C=NR$_7$, —S—C=NR$_7$, —O—CR$_7$R$_8$—CR$_9$R$_{10}$NR$_{11}$R$_{12}$, —N=C=O, —C=NR$_7$, —CR$_7$R$_8$-Hal, —C(S)R$_7$, —CR$_7$R$_8$—P(O)R$_9$R$_{10}$, —CR$_7$R$_8$—PR$_9$R$_{10}$, —CR$_7$R$_8$—NR$_9$R$_{10}$, —CR$_7$R$_8$(OR$_9$)(OR$_{10}$), —CR$_7$R$_8$(OR$_9$)(NR$_{10}$), —CR$_7$R$_8$(NR$_9$)(NR$_{10}$), an acid anhydride, acetal, ketal group, —SO$_2$R$_7$, an amidine group, —NR$_7$C(S)NR$_8$, —NR$_7$C(S)—OR$_8$, —N=C=S, —NO$_2$, —C=N—OH, —N(R$_7$)=NR$_8$, —PR$_7$R$_8$R$_9$, —OSiR$_7$R$_8$R$_9$ or —SiR$_7$R$_8$R$_9$ in which $R_7$ to $R_{12}$ are each independently hydrogen or methyl or are selected from the above-mentioned substituents and in particular represent a radical-stabilizing or/and sterically demanding group.

In addition to the above-mentioned meanings, $R_2$ and $R_5$ can also be polymer residues having an average molecular mass (number average) of 100 to 50 000 Daltons, in particular 200 to 5000 Daltons. Preferred polymer residues $R_2$ and $R_5$ are for example: polyethene, polypropene, polybutene, polyisobutene, polyalkylene glycols, aliphatic or aromatic polyesters, polycaprolactones, polycarbonates, alkyd resins, polyepoxides, polymethacrylates, polyacrylates, polydimethylsiloxanes and polyurethanes.

1,1,2,2-Tetraphenyl-1,2-dicyano-ethane, 1,1,2,2-tetraphenyl-1,2-diphenoxyethane and 1,1,2,2-tetraphenyl-1,2-bis(trimethylsiloxy)ethane are preferably used as component (D).

1,1,2,2-Tetraphenylethane derivatives which carry polymeric residues $R_2$ and $R_5$ consisting of polyethylene glycol and/or polypropylene glycol and 1,1-diphenyl ethylene are particularly preferred.

The amounts used of the components (A) to (D) that are essential to the invention can be varied within wide limits, but it has proven to be particularly advantageous to use about 5 to 90% by weight of the monomer component (A), about 0.01 to about 30% by weight of the initiator component (B), about 0.01 to about 30% by weight of the polysaccharide component (C), about 0.01 to about 30% by weight of the regulator component (D) and water as the remainder in the process according to the invention.

The amount of water in the reaction mixture is preferably $\geq 10\%$ by weight water, preferably $\geq 20\%$ by weight water. In a preferred embodiment only water is used as a solvent, organic solvents are not required in this preferred embodiment.

The water-soluble and water-insoluble monomers are polymerized by solution, precipitation or emulsion polymerization in aqueous solution where solution polymerization is preferred. The polymerization can be carried out as a batch, semi-continuous or continuous reaction. In this connection the polymerization can also be carried out as part of a sequential polymerization.

Solution or precipitation polymerization of the monomers is usually carried out at temperatures of about 20 to about 100° C. In the case of the azo or persulfate system the temperature is preferably in a range of about 60° C. to about 90° C. In the case of the redox system the temperature is preferably in a range of about 20° C. to about 70° C. It is preferable to firstly add the monomer component (A), polysaccharide component (C), regulator component (D) and water to the reaction vessel and then start the polymerization by adding the initiator component (B) or a complex of initiator component (B) and polysaccharide component (C). The water-insoluble initiator component (B) and regulator component (D) are brought into aqueous solution as complexes with the polysaccharide component (C).

In a preferred embodiment a first portion of the monomer component (A), polysaccharide component (C) and regulator component (D) are firstly placed in aqueous solution in the reaction vessel for the synthesis of block copolymers; the polymerization is started by adding the initiator component (B) or a complex of component (B) and component (C). After the first portion the monomer component (A) has completely reacted, the second portion of the monomer component (A) is added continuously or all at once. After the second portion has completely reacted, further monomer (A) can be added or the polymerization can be ended by cooling the polymerization solution.

Within the scope of the present invention it is possible to, as it were, dissolve water-insoluble components by the following complexation steps:

1. Optionally complexing the monomer component (A) having a low water solubility with a cyclic polysaccharide derivative (C) which has a hydrophobic cavity into which the water-insoluble monomer fits.
2. Complexing the initiator component (B) having a low water solubility with a cyclic polysaccharide derivative (C) which has a hydrophobic cavity into which the water-insoluble initiator fits.
3. Complexing the regulator component (D) with a cyclic polysaccharide derivative (C) which has a hydrophobic cavity into which the regulator component (D) fits.

Monomer component (A) having a low water solubility can optionally be complexed with a cyclic polysaccharide derivative. Water-soluble monomers do not need to be complexed with a cyclic polysaccharide derivative (C). Furthermore, the regulator component (D) can be complexed with a suitable cyclic polysaccharide derivative (C). If a water-insoluble radical initiator (B) is used, it is preferable to complex it with a suitable cyclic polysaccharide derivative (C).

The water-insoluble regulator component (D) can for example be complexed with a cyclic polysaccharide derivative (C) with a hydrophobic cavity:

a) the cyclic polysaccharide derivative (C) with a hydrophobic cavity can be mixed individually with the water-insoluble regulator component (D) and the complexed mixture can then be added to the reaction vessel together with the other (optionally complexed) reactants, or
b) the cyclic polysaccharide derivative (C) with a hydrophobic cavity can be added to the reaction vessel before, during or after the reactant mixture.

The molar ratio of the polysaccharide component (C) with the hydrophobic cavity that is complexed with the regulator component (D) depends on the type of cyclic polysaccharide derivative (C) with the hydrophobic cavity. The molar ratio of the polysaccharide component (C) with the hydrophobic cavity to the regulator component (D) is in particular about 100:1 to about 1:100, preferably about 10:1 to about 1:10 and particularly preferably about 2:1 to about 1:2.

The water-insoluble initiator component (B) can for example be complexed with the cyclic polysaccharide derivative (C) with a hydrophobic cavity in the following manner:

a) the cyclic polysaccharide derivative (C) with a hydrophobic cavity can be mixed individually with the water-insoluble initiator component (B) and the complexed mixture can then be added to the reaction vessel together with the other (optionally complexed) reactants, or
b) the cyclic polysaccharide derivative (C) with a hydrophobic cavity can be added to the reaction vessel before, during or after the reactant mixture.

The molar ratio of the polysaccharide component (C) with the hydrophobic cavity that is complexed with the initiator component (B) depends on the type of cyclic polysaccharide derivative (C) with a hydrophobic cavity. The molar ratio of the polysaccharide component (C) with a hydrophobic cavity to the initiator component (B) is in particular about 100:1 to about 1:100, preferably about 10:1 to about 1:10 and particularly preferably about 2:1 to about 1:2.

The process according to the invention has many advantageous properties:

The polymers prepared in this manner have a narrow molecular weight-distribution $M_w/M_n$ of about 1.1–2.0.

Unbranched and branched homo- and copolymers as well as block copolymers can be produced by appropriate selection of the monomer components (A) and optionally subsequent addition of various monomer components (A).

The block copolymers produced according to the invention are substantially free of homopolymers.

The polymerization can be carried out in any pH range.

The polymerization can be carried out with commercial water-insoluble azo initiators such as 2,2'-azobis(2-methylpropionitrile) or 2,2'-azobis(2-methyl-butyronitrile) which are more economical and have a much lower decomposition temperature than water-soluble azo initiators.

Controlled radical polymerization in aqueous solution can be carried out on a ton-scale, since the liberated reaction heat can be dissipated by the water solvent.

In contrast to the prior art it is not necessary to use N-oxides (nitroxyl compounds), triazolinyl compounds or copper halogen compounds which are poisonous and remain in the polymer or adversely affect its properties.

In comparison with the prior art it is possible to use considerably lower amounts of initiator and regulator which is why the polymers produced according to the invention only contain small amounts of decomposition products of initiator and regulator.

The polymers produced by the process according to the invention can for example be used as binders for one-component and two-component coatings, sealants, adhesives, paints or membranes, sport floor coverings and sealings for the surfaces of mineral building materials such as concrete, gypsum, cement as well as glass, wood, paper, metal or plastic.

The polymers produced by the process according to the invention are also extremely suitable for example as additives for aqueous suspensions of inorganic or organic solids especially those based on mineral or bituminous binders such as cement, gypsum, lime, anhydrite or other building materials based on calcium sulfate, or based on dispersion binders in a powder form where they are used in an amount of about 0.01 to about 10% by weight, in particular about 0.05 to about 5% by weight based on the weight of the mineral binder. The polymers produced by the process according to the invention can also be used extremely well in the fields of ceramic materials, fire resisting materials and building materials for oil fields.

The polymers produced by the process according to the invention and the construction chemical products produced therefrom can be applied by any process known in the prior art in particular using methods known from coating technology such as flooding, pouring, knife-coating, spraying, painting, immersing, rolling.

The following examples are intended to further illustrate the invention.

EXAMPLES

The molecular masses were determined by means of gel permeation chromatography (GPC)

System: Waters Alliance 2690

Eluant: 80% by weight 0.05 m ammonium formate solution, 20% by weight acetonitrile Columns: Shodex OH PAC 804 HQ, Shodex OH PAC 802.5, HQ Calibration: against polyethylene oxide standards In order to determine the block structure, a sample was taken in each case after the polymerization of the first monomer and the molecular mass and polydispersity were determined by GPC, then the second monomer was added and subsequently the molecular mass and polydispersity of the block copolymer was determined.

Example 1

Synthesis of poly(2-hydroxyethyl methacrylate)

0.29 g (1.6 mmol) 1,1-diphenylethylene was dissolved within 30 minutes in 20 g of an aqueous solution comprising 17.68 g distilled water and 2.32 g (1.6 mmol) hydroxypropylated cyclodextrin (hp-β-CD, Cavasol®W7 HP, Wacker-Chemie GmbH, Munich, Germany) while stirring vigorously or using ultrasound to form a clear and homogeneous solution. This solution, 150 g distilled water and 70 g (538 mmol) 2-hydroxyethyl methacrylate were heated to 85° C. Then 1.10 g (4.8 mmol) ammonium peroxodisulfate dissolved in 10 g distilled water was added dropwise within 1 min by means of a dropping funnel. The mixture was subsequently kept for 5 hours at 90° C.

A clear orange coloured aqueous solution of poly(2-hydroxyethyl methacrylate) is obtained with a Mw=5200 g/mol and a polydispersity of 1.21.

Example 2

Synthesis of poly(acrylic acid-b-methyl methacrylate)

0.40 g (2.2 mmol) 1,1-diphenylethylene was dissolved within 30 minutes in 20 g of an aqueous solution consisting of 17.05 g distilled water and 2.95 g (2.2 mmol) methylated cyclodextrin (m-β-CD, Cavasol®W7 M, Wacker-Chemie GmbH, Munich, Germany) while stirring vigorously or using ultrasound to form a clear and homogeneous solution.

This solution, 165 g distilled water and 9.81 g 25% ammonia solution were heated to 85° C. Then 40 g (555 mmol) acrylic acid and 1.27 g (5.6 mmol) ammonium peroxodisulfate dissolved in 10 g distilled water were added in parallel within 3 min. The mixture was subsequently kept for 5 hours at 90° C. Afterwards 1 g of the reaction solution was removed for the GPC. A clear orange coloured aqueous solution of polyacrylic acid is obtained with a $M_w$=23200 g/mol and a polydispersity of 1.33. Then 10 g methyl methacrylate (100 mmol) was added to this mixture and kept for a further 5 hours at 90° C.

A readily dispersed orange coloured aqueous solution of poly(acrylic acid-b-methyl methacrylate) is obtained with a $M_w$=28900 g/mol and a polydispersity of 1.47.

Example 3

Synthesis of poly[acrylic acid-b-(2-hydroxyethyl methacrylate)]

0.56 g (3.1 mmol) 1,1-diphenylethylene was dissolved within 30 minutes in 20 g of an aqueous solution consisting of 15.5 g distilled water and 4.50 g (2.2 mmol) hydroxypropylated cyclodextrin (hp-β-CD, Cavasol®W7 M, Wacker-Chemie GmbH, Munich, Germany) while stirring vigorously or using ultrasound to form a clear and homogeneous solution.

This solution, 130 g distilled water and 10.38 g 25% ammonia solution were heated to 85° C. Then 50 g (694 mmol) acrylic acid and 2.49 g (6.2 mmol) dilauroyl peroxide suspended in 10 g distilled water were added in parallel within 3 min. The mixture was subsequently kept for 5 hours at 90° C. Afterwards 1 g of the reaction solution was removed for the GPC. A clear yellow aqueous solution of polyacrylic acid is obtained with a $M_w$=15800 g/mol and a polydispersity of 1.39. Then 22 g 2-hydroxyethyl methacrylate (169 mmol) was added to this mixture and kept for a further 5 hours at 90° C.

A clear orange coloured aqueous solution of poly(acrylic acid-b-hydroxyethyl methacrylate) is obtained with a $M_w$=21400 g/mol and a polydispersity of 1.54.

Example 4

Synthesis of poly[(2-hydroxyethyl methacrylate)-b-acrylic acid]

0.27 g (1.5 mmol) 1,1-diphenylethylene was dissolved within 30 minutes in 20 g of an aqueous solution comprising 18.03 g distilled water and 1.97 g (1.5 mmol) methylated cyclodextrin (m-β-CD, Cavasol®W7 HP, Wacker-Chemie GmbH, Munich, Germany) while stirring vigorously or using ultrasound to form a clear and homogeneous solution.

This solution, 160 g distilled water and 0.73 g 25% ammonia solution and 35 g (269 mmol) 2-hydroxyethyl methacrylate were heated to 85° C. Then 0.57 g (3 mmol) 2,2'-azobis(2-methylbutyronitrile) was added to the reaction solution. The mixture was subsequently kept for 5 hours at 90° C. Afterwards 1 g of the reaction solution was removed for the GPC. A clear orange coloured aqueous solution of poly(2-hydroxyethyl methacrylate) is obtained with a $M_w$=7600 g/mol and a polydispersity of 1.59.

Then 6.13 g 25% ammonia solution and 25 g (347 mmol) acrylic acid were added to this mixture and kept for a further 5 hours at 90° C.

A clear dark orange coloured aqueous solution of poly[(hydroxyethyl methacrylate)-b-acrylic acid] is obtained with a $M_w$=14900 g/mol and a polydispersity of 1.71.

Example 5

Synthesis of poly(methacrylic acid-b-styrene)

0.40 g (2.2 mmol) 1,1-diphenylethylene was dissolved within 30 minutes in 20 g of an aqueous solution consisting of 16.84 g distilled water and 3.16 g (2.2 mmol) hydroxypropylated cyclodextrin (hp-β-CD, Cavasol®W7 HP, Wacker-Chemie GmbH, Munich, Germany) while stirring vigorously or using ultrasound to form a clear and homogeneous solution.

This solution, 135 g distilled water and 9.24 g 25% ammonia solution were heated to 85° C. Then 45 g (523 mmol) methacrylic acid and 1.06 g (4.4 mmol) sodium peroxodisulfate dissolved in 10 g distilled water were added in parallel within 3 min. The mixture was subsequently kept for 5 hours at 90° C. Afterwards 1 g of the reaction solution was removed for the GPC. A clear yellow aqueous solution of polymethacrylic acid is obtained with a $M_w$=21500 g/mol and a polydispersity of 1.34.

11 g styrene (106 mmol) was added to this mixture and kept for a further 5 hours at 90° C.

A readily dispersed orange coloured aqueous solution of poly(methacrylic acid-b-styrene) was obtained with a $M_w$=25300 g/mol and a polydispersity of 1.49.

Example 6

Synthesis of poly[(2-hydroxyethyl methacrylate)-b-styrene)]

0.71 g (1.8 mmol) 1,1,2,2-tetraphenyl-1,2-dicyanoethane was dissolved within 30 minutes in 20 g of an aqueous solution consisting of 17.34 g distilled water and 2.66 g (2.2 mmol) hydroxypropylated β-cyclodextrin (hp-β-CD, Cavasol®W7 HP, Wacker-Chemie GmbH, Munich, Germany) while stirring vigorously or using ultrasound to form a clear and homogeneous solution.

This solution, 125 g distilled water and 60 g (461 mmol) 2-hydroxyethyl methacrylate were heated to 85° C. Then 0.71 g (3.7 mmol) 2,2'-azobis(2-methyl-butyronitrile) was added to the reaction solution. The mixture was subsequently kept for 5 hours at 90° C. Afterwards 1 g of the reaction solution was removed for the GPC. A clear yellow aqueous solution of poly(2-hydroxyethyl methacrylate) was obtained with a $M_w$=5500 g/mol and a polydispersity of 1.45.

Then 10 g styrene (96 mmol) was added to this mixture and kept for a further 5 hours at 90° C.

A readily dispersed orange coloured aqueous solution of poly[(2-hydroxyethyl methacrylate)-b-styrene] is obtained with a $M_w$=6400 g/mol and a polydispersity of 1.62.

Example 7

Synthesis of poly(methacrylic acid-b-methyl methacrylate)

6 g (16.4 mmol) 1,1,2,2-tetraphenyl-1,2-ethanediol was reacted for 5 hours at 80° C. with 5.70 g (32.8 mmol) toluene diisocyanate in a solvent mixture of 25 g methyl ethyl ketone and 25 g toluene. Subsequently 5.3 g (32.2 mmol) triethylene glycol monomethyl ether was added and it was kept at 80° C. until the NCO content had fallen to 0. The solvent mixture was removed and a light brown crystalline product was obtained.

3.33 g (3.2 mmol) of the synthesised crystalline urethane adduct was dissolved in 20 g of an aqueous solution consisting of 15.75 g distilled water and 4.25 g (3.2 mmol) methylated β-cyclodextrin (m-β-CD, Cavasol®W7 M, Wacker-Chemie GmbH, Munich, Germany) while stirring vigorously or using ultrasound to form a clear and homogeneous solution.

This solution, 140 g distilled water and 11.30 g 25% ammonia solution were heated to 85° C. Then 55 g (639 mmol) methacrylic acid and 1.29 g (5.4 mmol) sodium peroxodisulfate dissolved in 10 g distilled water were added in parallel within 3 minutes. The mixture was subsequently kept for 5 hours at 90° C. Afterwards 1 g of the reaction solution was removed for the GPC. A clear yellowish aqueous solution of polymethacrylic acid was obtained with a $M_w$=17400 g/mol and a polydispersity of 1.38.

Then 16 g methyl methacrylate (160 mmol) was added to this mixture and kept for a further 5 hours at 90° C.

A readily dispersed yellowish aqueous solution of poly (methacrylic acid-b-methyl methacrylate) is obtained with a $M_w$=21100 g/mol and a polydispersity of 1.55.

Example 8

Synthesis of poly[(methyl polyethylene glycol-350-methacrylate)-b-(n-butyl acrylate)]

1.16 g (1.1 mmol) of the synthesised crystalline urethane adduct from example 7 was dissolved in 20 g of an aqueous solution consisting of 18.4 g distilled water and 1.6 g (1.1 mmol) hydroxypropylated β-cyclodextrin (hp-β-CD, Cavasol®W7 HP, Wacker-Chemie GmbH, Munich, Germany) while stirring vigorously or using ultrasound to form a clear and homogeneous solution.

This solution and 160 g distilled water were heated to 85° C. Then 60 g (171 mmol) methylpolyethylene glycol-350-methacrylate and 0.35 g (1.5 mmol) ammonium peroxodisulfate dissolved in 10 g distilled water were added in parallel within 3 minutes. The mixture was subsequently kept for 5 hours at 90° C. Afterwards 1 g of the reaction solution was removed for the GPC. A clear colourless aqueous solution of poly(MPEG-350-MA) was obtained with a $M_w$=26500 g/mol and a polydispersity of 1.40.

Then 12 g n-butyl acrylate (94 mmol) was added to this mixture and kept for a further 5 hours at 90° C.

A readily dispersed yellowish aqueous solution of poly [(methyl polyethylene glycol-350-methacrylate)-b-(n-butyl acrylate)] was obtained with a $M_w$=30700 g/mol and a polydispersity of 1.58.

Example 9

Synthesis of poly[(methyl polyethylene glycol-500-methacrylate)-b-(2-hydroxyethyl methacrylate)]

6 g (16.4 mmol) 1,1,2,2-tetraphenyl-1,2-ethanediol was reacted for 3 hours at 50° C. with 3.90 g (32.8 mmol) phenyl isocyanate in 50 g acetone until the NCO content had fallen to 0. Subsequently the acetone was removed and a white crystalline product was obtained.

0.51 g (0.843 mmol) of the synthesised crystalline urethane adduct was dissolved in 20 g of an aqueous solution consisting of 18.88 g distilled water and 1.12 g (0.843 mmol) hydroxypropylated β-cyclodextrin (hp-β-CD, Cavasol®W7 HP, Wacker-Chemie GmbH, Munich, Germany) while stirring vigorously or using ultrasound to form a clear and homogeneous solution. This solution, 150 g distilled water and 60 g (120 mmol) methylpolyethylene glycol-500-methacrylate were heated to 85° C. 0.27 g (1.2 mmol) ammonium peroxodisulfate dissolved in 10 g distilled water was added dropwise by means of a dropping funnel within 3 minutes. The mixture was subsequently kept for 5 hours at 90° C. Afterwards 1 g of the reaction solution was removed for the GPC. A clear colourless aqueous solution of poly(MPEG-500-MA) was obtained with a $M_w$=38800 g/mol and a polydispersity of 1.45.

Then 22 g hydroxyethyl methacrylate (169 mmol) was added to this mixture and kept for a further 5 hours at 90° C.

A readily dispersed yellowish aqueous solution of poly [(methyl polyethylene glycol-500-methacrylate)-b-(2-hydroxyethylmethacrylate] was obtained with a $M_w$=51400 g/mol and a polydispersity of 1.66.

Example 10

Synthesis of poly[acrylic acid-b-(n-butyl acrylate)]

2.27 g (3.75 mmol) of the synthesized crystalline urethane adduct from example 9 was dissolved within 30 minutes in 20 g of an aqueous solution comprising 15.02 g distilled water and 4.98 g (3.75 mmol) methylated β-cyclodextrin (m-β-CD, Cavasol®W7 M, Wacker-Chemie GmbH, Munich, Germany) while stirring vigorously or using ultrasound to form a clear and homogeneous solution. This solution and 145 g distilled water were heated to 85° C. Then 45 g (624 mmol) acrylic acid and 2.13 g (5.3 mmol) dilauroyl peroxide suspended in 10 g distilled water were added in parallel. The mixture was subsequently kept for 5 hours at 90° C. Afterwards 1 g of the reaction solution was removed for the GPC. A clear yellow aqueous solution of poly(acrylic acid) is obtained with a $M_w$=13700 g/mol and a polydispersity of 1.35.

Then 16 g n-butyl acrylate (125 mmol) was added to this mixture and kept for a further 5 hours at 90° C.

A readily dispersed yellow aqueous solution of poly [acrylic acid-b-(n-butyl acrylate)] was obtained with a $M_w$=17800 g/mol and a polydispersity of 1.50.

The invention claimed is:

1. A process for producing homo-, co- and block copolymers by controlled radical polymerization in aqueous solution, comprising reacting a monomer component (A) comprising at least one radically polymerizable monomer, an initiator component (B) comprising at least one radical initiator, a polysaccharide component (C) comprising at least one cyclic polysaccharide or polysaccharide derivative and a regulator component (D) comprising at least one compound of the general formula (Ia) or (Ib) are reacted in the presence of water,

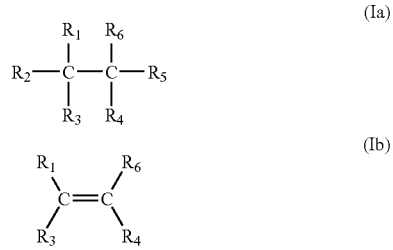

wherein $R_1$, $R_3$, $R_4$ and $R_5$ each independently represent hydrogen, an optionally substituted $C_1$–$C_{20}$ alkyl residue, $C_3$–$C_8$ cycloalkyl residue, $C_7$–$C_{34}$ aralkyl residue or aromatic $C_6$–$C_{14}$ hydrocarbon residue in which the substituents are selected from the group consisting of OH, SH, $NH_2$, $NHR_{13}$, $N(R_{13})_2$, $NH_3^+$, $NH_2R_{13}^+$, $NH(R_{13})_2^+$, $N(R_{13})_3^+CN$, $SO_3X$, $PO_3X_2$, $CO_2X$ and CHO, wherein X denotes H, an alkali or alkaline earth ion and $R_{13}$ denotes a $C_1$–$C_5$ alkyl residue, $R_2$ and $R_5$ each independently represent hydrogen, an optionally substituted $C_1$–$C_{20}$ alkyl residue, $C_3$–$C_8$ cycloalkyl residue, $C_7$–$C_{34}$ aralkyl residue or aromatic $C_6$–$C_{14}$ hydrocarbon residue, or a polymer residue having an average molecular mass (number average) of 100 to 50,000 Daltons, and at least two but at most four of the residues $R_1$ to $R_6$ represent an aromatic hydrocarbon residue.

2. The process as claimed in claim 1, wherein 5 to 90% by weight of the monomer component (A), 0.01 to 30% by weight of the initiator component (B), 0.01 to 30% by weight of the polysaccharide component (C), 0.01 to 30% by weight of the regulator component (D) and water as the remainder are used.

3. The process as claimed in claim 1, wherein the polymer residue $R_2$ or $R_5$ has an average molecular mass of 200 to 5000 Daltons.

4. The process as claimed in claim 1, wherein the initiator component (B) is selected from the group consisting of a peroxo-disulfate an azo compound and a peroxide compound.

5. The process as claimed in claim 4, wherein the azo or peroxide compounds are water-soluble compounds.

6. The process as claimed in claim 1, wherein the proportion of initiator component (B) is 0.01 to 10 mole % based on the amount of monomer component (A).

7. The process as claimed in claim 1, wherein a water-insoluble initiator component (B) is used in a complexed form with the polysaccharide component (C).

8. The process as claimed in claim 1, wherein the polysaccharide component (C) is selected from the group consisting of optionally substituted cyclodextrins or esters, alkyl ethers, hydroxyalkyl ethers, alkoxycarbonylalkyl ethers and carboxyalkyl ethers or salts thereof, in which the alkyl residues have 1 to 30 C atoms.

9. The process as claimed in claim 1, wherein the polysaccharide component (C) is selected from the group consisting of α-, β-or γ-cyclodextrins, partially or completely acetylated, methylated, hydroxylated and succinylated α-, β-, γcyclodextrins and mixed methylated and acetylated β-cyclodestrins.

10. The process as claimed in claim 1, wherein the polysaccharide component (C) comprises β-cyclodextrin, 2,6-dimethyl-β-cyclodextrin or (2-hydroxy)propyl-13-cyclodextrin.

11. The process as claimed in claim 1, wherein the regulator component (D) is used in a complexed form with the polysaccharide component (C).

12. The process as claimed in claim 1, wherein the molar ratio of the polysaccharide component (C) to the regulator component (D) is 100:1 to 1:100.

13. The process as claimed in claim 1, wherein the reaction is carried out in the form of a solution polymerization.

14. The process as claimed in claim 12, wherein said molar ratio is from 10:1 to 1:10.

15. The process as claimed in claim 14, wherein the molar ratio is from 2:1 to 1:2.

16. The process of claim 9, wherein the polysaccharide component (C) is≧1% partially acetylated, methylated, hydroylated or succinylated.

17. The process of claim 16, wherein the polysaccharide component (C) is ≧2% partially acetylated, methylated, hydroylated or succinylated.

18. The process as claimed in claim 1, wherein the molar ratio of the polysaccharide component (C) to the initiator component (B) is 100:1 to 1:100.

* * * * *

UNITED STATES PATENT AND TRADEMARK OFFICE
CERTIFICATE OF CORRECTION

| | | |
|---|---|---|
| PATENT NO. | : 7,199,200 B2 | Page 1 of 1 |
| APPLICATION NO. | : 10/515937 | |
| DATED | : April 3, 2007 | |
| INVENTOR(S) | : Ingrisch et al. | |

It is certified that error appears in the above-identified patent and that said Letters Patent is hereby corrected as shown below:

On the cover page:

(12) Replace "Stefan" with -- Ingrisch --

(75) Replace "Ingrisch Stefan" with -- Stefan Ingrisch --

(75) Replace "Maier Alois" with -- Alois Maier --

(75) Replace "Pfeuffer Thomas" with -- Thomas Pfeuffer --

(75) Replace "Steidl Norbert" with -- Norbert Steidl --.

Signed and Sealed this

Sixteenth Day of October, 2007

JON W. DUDAS
*Director of the United States Patent and Trademark Office*